United States Patent
Lan

(10) Patent No.: US 11,668,784 B2
(45) Date of Patent: Jun. 6, 2023

(54) METHOD TO DETERMINE THE QUALITY OF CIVIC ADDRESS PRODUCED BY REVERSE GEOCODER

(71) Applicant: T-MOBILE INNOVATIONS LLC, Overland Park, KS (US)

(72) Inventor: Wei-Ming Lan, Morrisville, NC (US)

(73) Assignee: T-Mobile Innovations LLC, Overland Park, KS (US)

( * ) Notice: Subject to any disclaimer, the term of this patent is extended or adjusted under 35 U.S.C. 154(b) by 27 days.

(21) Appl. No.: 17/519,814

(22) Filed: Nov. 5, 2021

(65) Prior Publication Data

US 2023/0144228 A1 May 11, 2023

(51) Int. Cl.
| | |
|---|---|
| G01S 5/02 | (2010.01) |
| H04W 4/021 | (2018.01) |
| H04B 17/27 | (2015.01) |
| H04M 3/42 | (2006.01) |
| H04W 64/00 | (2009.01) |
| H04W 4/90 | (2018.01) |

(52) U.S. Cl.
CPC ............ *G01S 5/0236* (2013.01); *H04B 17/27* (2015.01); *H04M 3/42357* (2013.01); *H04W 4/022* (2013.01); *H04W 64/006* (2013.01); *H04W 4/90* (2018.02)

(58) Field of Classification Search
CPC .. G01S 5/0236; H04M 3/42357; H04B 17/27; H04W 4/022; H04W 64/006; H04W 4/90

USPC .. 455/404.1–404.2, 414.1–414.2, 456.1–457
See application file for complete search history.

(56) References Cited

U.S. PATENT DOCUMENTS

| | | | | |
|---|---|---|---|---|
| 6,138,026 | A * | 10/2000 | Irvin | H04M 11/04 455/456.3 |
| 11,445,354 | B1 * | 9/2022 | Brosowsky | H04W 4/90 |
| 2012/0258681 | A1 * | 10/2012 | Hanover | H04W 4/029 455/404.2 |
| 2013/0344898 | A1 * | 12/2013 | Hawkins | H04W 8/18 455/456.3 |
| 2017/0030732 | A1 * | 2/2017 | Holden | G01C 21/3682 |

* cited by examiner

*Primary Examiner* — Michael Y Mapa
(74) *Attorney, Agent, or Firm* — Shook, Hardy & Bacon L.L.P.

(57) ABSTRACT

Systems and methods are provided for determining the quality of a civic address produced by a reverse geocoder, utilizing the uncertainty of a geodetic location and a distance between the geodetic location and a geocoded location (i.e., a civic address) determined by the reverse geocoder. Upon receiving a request by a PSAP for a civic address corresponding to a UE initiating a call for emergency services, a node initially identifies a geodetic location of the UE and an uncertainty of the geodetic location. The node initiates an API call to a reverse geocoder API. The node receives a geocoded location corresponding to the geodetic location and compares the geocoded location to the geodetic location to determine a distance between them. Based on the uncertainty of the geodetic location and the distance between the geodetic location and the geocoded location, a quality of the civic address is determined.

20 Claims, 3 Drawing Sheets

METHOD TO DETERMINE THE QUALITY OF CIVIC ADDRESS PRODUCED BY REVERSE GEOCODER

SUMMARY

Embodiments of the technology described herein are directed to, among other things, systems and methods for determining the quality of a civic address produced by a reverse geocoder. More particularly, the uncertainty of a geodetic location and a distance between the geodetic location and a geocoded location (i.e., a civic address or address) determined by a reverse geocoder can be utilized to derive the quality of the civic address. For example, upon receiving a request by a public safety answer point (PSAP) for a civic address corresponding to user equipment (UE) initiating a call for emergency services, a node initially identifies a geodetic location of the UE and an uncertainty of the geodetic location. The node initiates an application programming interface (API) call to a reverse geocoder API (e.g., GOOGLE Reverse Geocoding). The node receives a geocoded location corresponding to the geodetic location and compares the geocoded location to the geodetic location to determine a distance between the geocoded location and the geodetic location. Based on the uncertainty of the geodetic location and the distance between the geodetic location and the geocoded location, a quality of the civic address is determined.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein.

DETAILED DESCRIPTION

Figure 1:
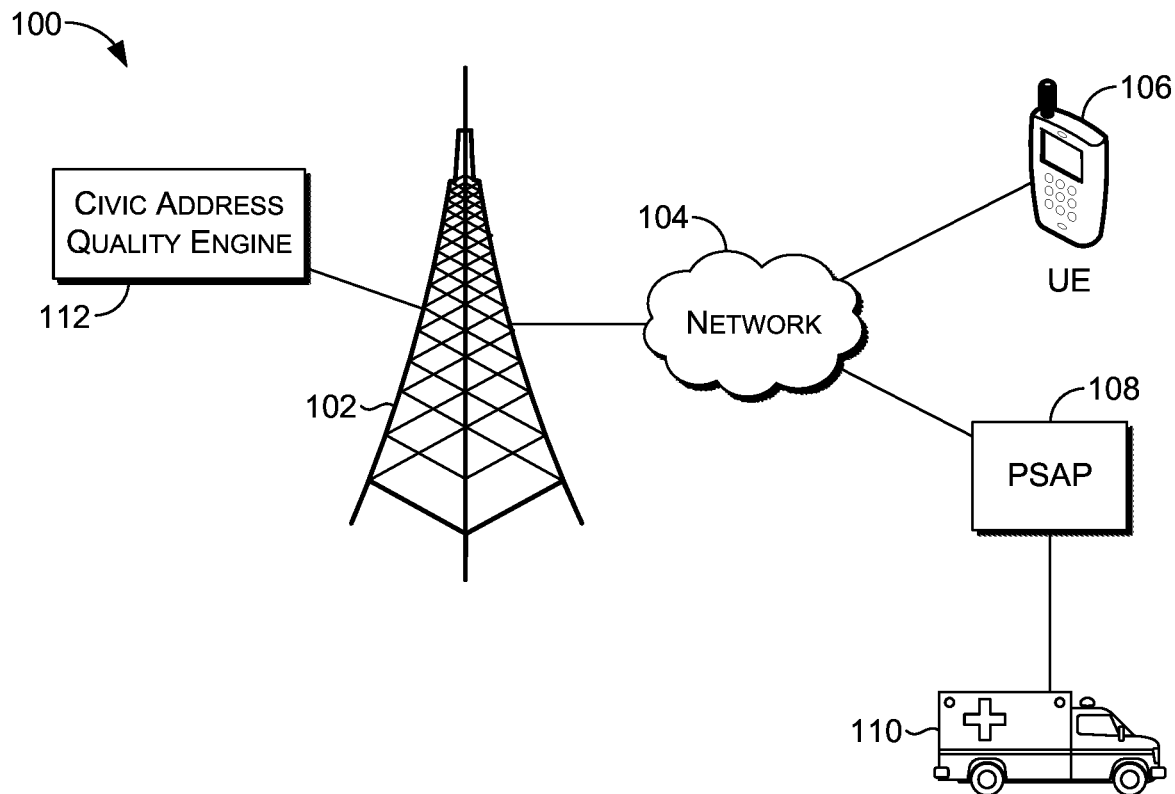
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BRS Broadband Radio Service
CD-ROM Compact Disk Read Only Memory
CDMA Code Division Multiple Access
EIRP Equivalent Isotropically Radiated Power
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit
NEXRAD Next-Generation Radar
NR New Radio
NSA Nonstandalone
OOBE Out-of-Band-Emission
PC Personal Computer
PCS Personal Communications Service
PDA Personal Digital Assistant
RAM Random Access Memory
RAT Radio Access Technology
RET Remote Electrical Tilt
RF Radio-Frequency
RFI Radio-Frequency Interference
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SA Standalone
SINR Signal-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, mMIMO/5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

The present disclosure is directed to systems, methods, and computer readable media that systems and methods for determining the quality of a civic address produced by a reverse geocoder. More particularly, the uncertainty of a geodetic location and a distance between the geodetic location and a geocoded location (i.e., a civic address or address) determined by a reverse geocoder can be utilized to derive the quality of the civic address. For example, upon receiving a request by a PSAP for a civic address corresponding to a UE initiating a call for emergency services, a node initially identifies a geodetic location of the UE and an uncertainty of the geodetic location. The node initiates an API call to a reverse geocoder API (e.g., GOOGLE Reverse Geocoding). The node receives a geocoded location corresponding to the geodetic location and compares the geocoded location to the geodetic location to determine a distance between the geocoded location and the geodetic location. Based on the uncertainty of the geodetic location and the distance between the geodetic location and the geocoded location, a quality of the civic address is determined.

In some aspects, based on the quality of the civic address satisfying a configurable threshold, the civic address is provided to the PSAP. For example, if the uncertainty is low (e.g., less than 10%) and the distance is within a certain range, the quality satisfies the configurable threshold and the civic address is provided to the PSAP. In contrast, if the uncertainty is low and the distance is not within a certain range, the quality does not satisfy the configurable threshold and the civic address is not provided to the PSAP. Similarly, if the uncertainty is high (e.g., greater than 10%) and the distance is within a certain range, the quality does not satisfy the configurable threshold and the civic address is not provided to the PSAP. Likewise, if the uncertainty is high and the distance is not within a certain range, the quality does not satisfy the configurable threshold and the civic address is not provided to the PSAP.

According to aspects of the technology described herein, a method for determining the quality of civic address produced by reverse geocoder is provided. The method comprises receiving, at a node, a request by a public safety answer point (PSAP) for a civic address corresponding to user equipment (UE) initiating a call for emergency services. The method also comprises identifying, by the node, a geodetic location having an uncertainty. The method further comprises initiating, by the node, an application programming interface (API) call to a reverse geocoder API. The API call includes the geodetic location. The method also comprises receiving, by the node, a geocoded location corresponding to the geodetic location. The method further comprises comparing, by the node, the geocoded location to the geodetic location to determine a distance between the geodetic location and the geocoded location. The method also comprises based on the uncertainty of the geodetic location and the distance between the geodetic location and the geocoded location, determining a quality of the civic address. The method further comprises based on the quality of the civic address satisfying a configurable threshold, providing the civic address to the PSAP. The civic address is the geocoded location.

According to further aspects of the technology described herein, one or more computer-readable media having computer-executable instructions embodied thereon that, when executed by at least one computing device, cause the computing device to perform operations for determining the quality of civic address produced by reverse geocoder. The operations comprise receiving, at a node, a request by a public safety answer point (PSAP) for a civic address corresponding to user equipment (UE) initiating a call for emergency services. The operations also comprise identifying, by the node, a geodetic location having an uncertainty. The operations further comprise initiating, by the node, an application programming interface (API) call to a reverse geocoder API. The API call includes the geodetic location. The operations also comprise receiving, by the node, a geocoded location corresponding to the geodetic location. The operations further comprise comparing, by the node, the geocoded location to the geodetic location to determine a distance between the geodetic location and the geocoded location. The operations also comprise based on the uncertainty of the geodetic location and the distance between the geodetic location and the geocoded location, determining a quality of the civic address. The operations further comprise based on the quality of the civic address satisfying a configurable threshold, providing the civic address to the PSAP. The civic address is the geocoded location.

According to even further aspects of the technology described herein, a system for determining the quality of civic address produced by reverse geocoder is provided. The system comprises a user equipment (UE). The system also comprises a node configured to: receive a request by a public safety answer point (PSAP) for a civic address corresponding to the UE initiating a call for emergency services; identify a geodetic location having an uncertainty; initiate an application programming interface (API) call to a reverse geocoder API, the API call including the geodetic location; receive a geocoded location corresponding to the geodetic location; compare the geocoded location to the geodetic location to determine a distance between the geodetic location and the geocoded location; based on the uncertainty of the geodetic location and the distance between the geodetic location and the geocoded location, determine a quality of the civic address; and based on the quality of the civic address satisfying a configurable threshold, provide the civic address to the PSAP, the civic address being the geocoded location.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 4:
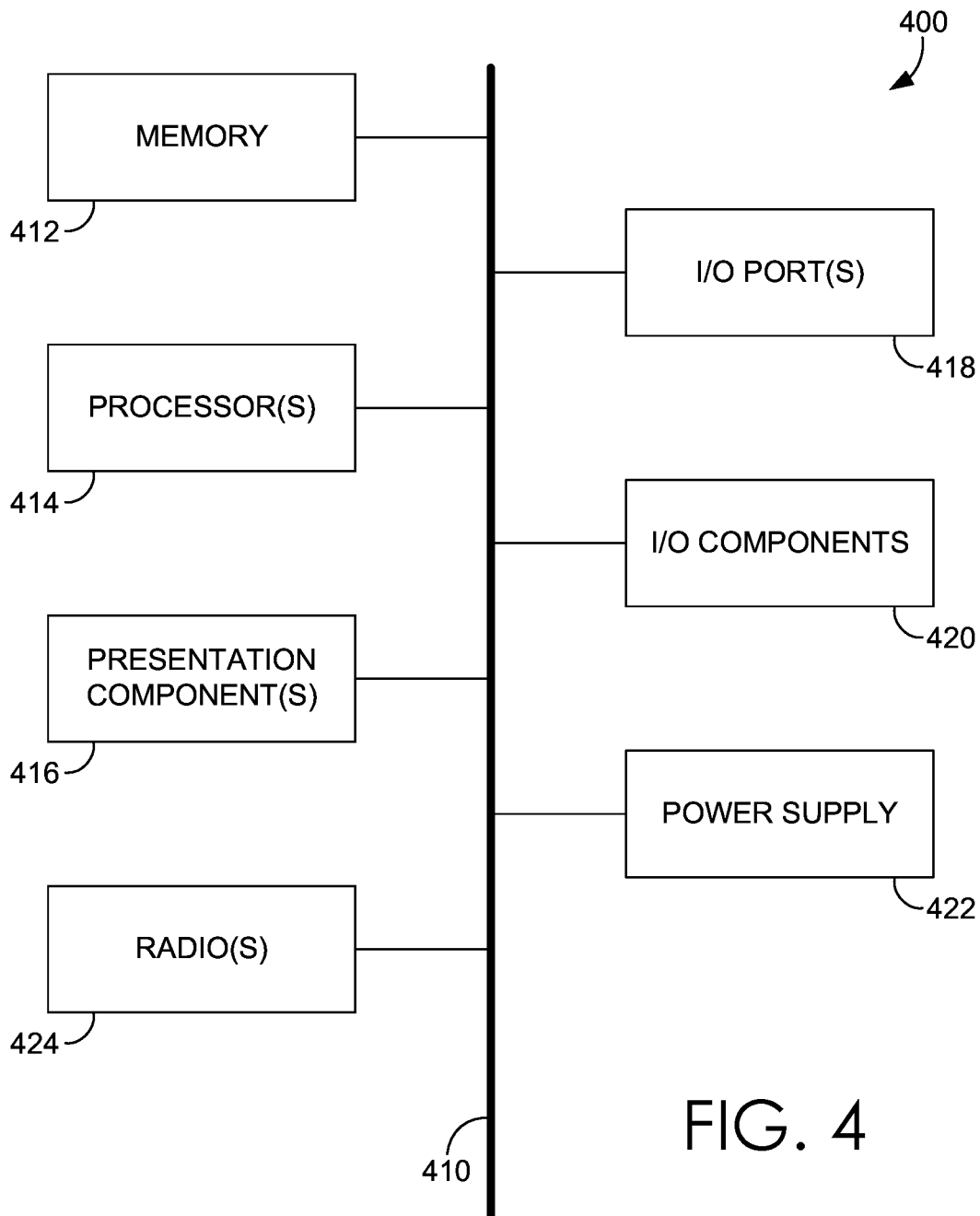
FIG. 4 depicts an example computing environment suitable for use in implementation of the present disclosure.

A network cell may comprise a base station to facilitate wireless communication between a communications device within the network cell, such as communications device 400 described with respect to FIG. 4, and a network. As shown in FIG. 1, a communications device may be a UE 106. In the network environment 100, UE 106 may communicate with other devices, such as mobile devices, servers, etc. The UE 106 may take on a variety of forms, such as a personal computer, a laptop computer, a tablet, a netbook, a mobile phone, a Smart phone, a personal digital assistant, or any other device capable of communicating with other devices. For example, the UE 106 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 106 comprises a wireless or mobile device with which a wireless telecommunication network(s) can be utilized for communication (e.g., voice and/or data communication). In this regard, the UE 106 can be any mobile computing device that communicates by way of, for example, a 5G network.

The UE 106 may utilize network 104 to communicate with other computing devices (e.g., mobile device(s), a server(s), a personal computer(s), etc.). In embodiments, network 104 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 104 may include multiple networks, as well as being a network of networks, but is shown in more simple form so as to not obscure other aspects of the present disclosure. Network 104 may be part of a telecommunications network that connects subscribers to their immediate service provider. In embodiments, network 104 is associated with a telecommunications provider that provides services to user devices, such as UE 106. For example, network 104 may provide voice services to user devices or corresponding users that are registered or subscribed to utilize the services provided by a telecommunications provider. It is contemplated network 104 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like.

The network environment 100 may include a database (not shown). The database may be similar to the memory component 412 in FIG. 4 and can be any type of medium that is capable of storing information. The database can be any collection of records (e.g., network or device information or a civic address database comprising a mapping of geodetic locations to geocoded locations). In one embodiment, the database includes a set of embodied computer-executable instructions that, when executed, facilitate various aspects disclosed herein. These embodied instructions will variously be referred to as "instructions" or an "application" for short.

As previously mentioned, the UE 106 may communicate with other devices by using a base station, such as base station 102. In embodiments, base station 102 is a wireless communications station that is installed at a fixed location, such as at a radio tower, as illustrated in FIG. 1. The radio tower may be a tall structure designed to support one or more antennas for telecommunications and/or broadcasting. In other embodiments, base station 102 is a mobile base station. The base station 102 may be an MMU and include gNodeB for mMIMO/5G communications via network 104. In this way, the base station 102 can facilitate wireless communication between UE 106 and network 104.

As stated, the base station 102 may include a radio (not shown) or a remote radio head (RRH) that generally communicates with one or more antennas associated with the base station 102. In this regard, the radio is used to transmit signals or data to an antenna associated with the base station 102 and receive signals or data from the antenna. Communications between the radio and the antenna can occur using any number of physical paths. A physical path, as used herein, refers to a path used for transmitting signals or data. As such, a physical path may be referred to as a radio frequency (RF) path, a coaxial cable path, cable path, or the like.

The antenna is used for telecommunications. Generally, the antenna may be an electrical device that converts electric power into radio waves and converts radio waves into electric power. The antenna is typically positioned at or near the top of the radio tower as illustrated in FIG. 1. Such an installation location, however, is not intended to limit the scope of embodiments of the present invention. The radio associated with the base station 102 may include at least one transceiver configured to receive and transmit signals or data.

In practice, a user of a UE 106 may need emergency services. The user places a call to emergency services (e.g., 911) and the base station 102 facilitates wireless communication between UE 106 and PSAP 108 via the network. In order to dispatch an emergency vehicle 112 to the proper location, PSAP 108 needs the civic address of the UE so the emergency vehicle 112 can provide assistance to the user at that location.

Continuing, the network environment 100 may further include a civic address quality engine 112. The civic address quality engine 112 may be configured to, among other things, determining the quality of civic address produced by reverse geocoder in accordance with the present disclosure. Though civic address quality engine 112 is illustrated as a component of base station 102 in FIG. 1, it may be a standalone device (e.g., a server having one or more processors), a service provided via the 5G network 104, a component of the UE 106, or may be remotely located.

Figure 2:
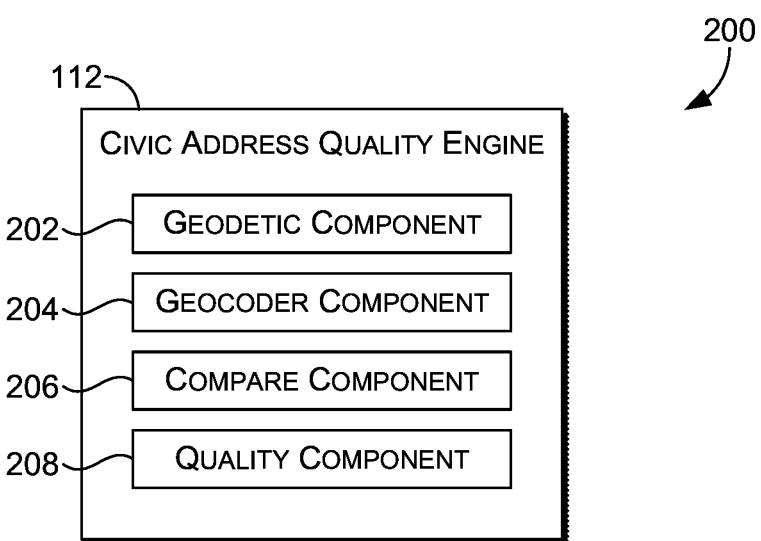
FIG. 2 illustrates a diagram of a civic address quality engine, in accordance with aspects herein.

Referring now to FIG. 2, the civic address quality engine 112 may include, among other things, geodetic component 202, geocoder component 204, compare component 206, and quality component 208. The civic address quality engine 112 may receive, among other things, data from user devices, such as UE 106, or PSAP 108 within a network cell associated with a particular base station 102. Additionally or alternatively, the civic address quality engine 112 may receive, among other things, data from base station 102, such as data from a gNodeB or eNodeB.

Geodetic component 202 generally receives a request by a PSAP for a civic address corresponding to a UE initiating a call for emergency services. Geodetic component 202 identifies a geodetic location of the UE. Additionally, the geodetic location is associated with an uncertainty that generally represents the radius of a circular area centered on the geodetic location identified by the node that the actual coordinates of the UE could fall.

Geocoder component 204 generally converts a geodetic location to a corresponding geocoded location (civic address), and vice versa.

Compare component 206 generally initiates an API call to a reverse geocoder API (e.g., GOOGLE Reverse Geocoding). The API call includes the geodetic location. The reverse geocoder API may be associated with a database mapping geodetic locations to geocoded locations and utilizes the geodetic location received as an input to determine the geocoded location. Compare component 206 receives the geocoded location corresponding to the geodetic location as an output of the reverse geocoder API.

Quality component 208 generally compares the geocoded location to the geodetic location and determines a distance between the geodetic location and the geocoded location. Based on the uncertainty of the geodetic location and the distance between the geodetic location and the geocoded location, quality component 208 determines a quality of the civic address. Based on the quality of the civic address satisfying a configurable threshold, quality component 208 provides the civic address to the PSAP. For clarity, the civic address is the geocoded location.

In aspects, quality component determines the uncertainty is low if it is 10% or less and high if it is greater than 10% (although these percentages may be configurable by a network operator). If the uncertainty is low and the distance is within a certain range or the uncertainty is low and the distance is not within a certain range, quality component 208 may determine the quality satisfies the configurable threshold. Alternatively, if the uncertainty is low but the distance is within a certain range, the uncertainty is high and the distance is within a certain range, or the uncertainty is high and the distance is not within a certain range, quality component 208 may determine the quality does not satisfy the configurable threshold. In these scenarios, quality component 208 discards the geocoded location as it does not likely accurately represent the civic address where the UE is located. In some aspects, the distance between the geodetic location and the geocoded location is configurable by a network operator. In some aspects, the uncertainty and/or the distance between the geodetic location and the geocoded location may vary based on aspects of the particular coverage area provided by the base station. For example, density, weather, terrain, physical structures, and the like may be utilized as factors that are considered when configuring uncertainty or the distance being with a certain range.

Figure 3:
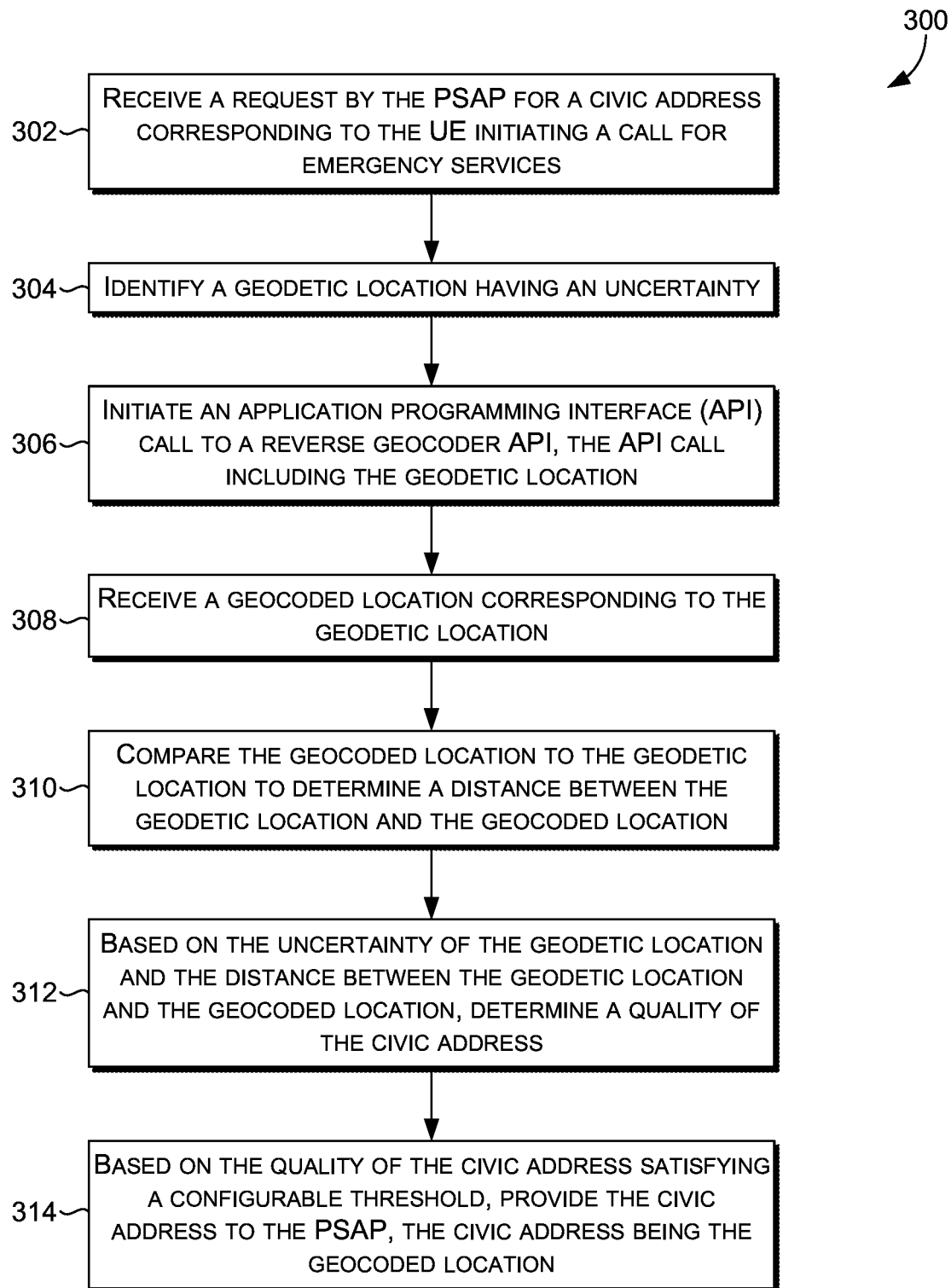
FIG. 3 is a flow diagram of an example method for determining the quality of civic address produced by reverse geocoder, in accordance with some aspects of the technology described herein.

Referring to FIG. 3, a flow diagram is provided depicting a method for determining the quality of civic address produced by reverse geocoder, according to aspects of the technology described herein. Initially, although not shown by FIG. 3, a user may initiate call for emergency services (e.g., a 911 call). The call is routed to a public safety answer point (PSAP).

At step 302, a request by the PSAP is received, at a node, for a civic address corresponding to UE initiating the call for emergency services. A geodetic location having an uncertainty is identified by the node, at step 304. The node may utilize global positioning system (GPS) that leverages the global navigation satellite system (GNSS) network to identify the geodetic location of the UE. Other techniques, such as GOOGLE Fused Location Provider API may be utilized by the node and/or the UE and provided to the node. In some aspects, signal strength triangulation may also be utilized by the node. The uncertainty of the geodetic location of the UE represents the likelihood that the actual coordinates of the UE could fall within the circular area centered on the geodetic location identified by the node.

The node initiates, at step 306, an API call to a reverse geocoder API. The API call includes the geodetic location as an input to the reverse geocoder API. In aspects, the reverse geocoder API is GOOGLE Reverse Geocoding. As output, the reverse geocoder API returns a geocoded location. At step 308, the geocoded location corresponding to the geodetic location is received by the node. The node compares, at step 310, the geocoded location to the geodetic location to determine a distance between the geodetic location and the geocoded location;

Based on the uncertainty of the geodetic location and the distance between the geodetic location and the geocoded location, the node determines a quality of the civic address, at step 312. Based on the quality of the civic address satisfying a configurable threshold, the civic address is provided, at step 314, to the PSAP. For clarity, the civic address is the geocoded location. In some aspects, if the quality of the civic address does not satisfy a configurable threshold, the civic address is not provided to the PSAP. The uncertainty of the geodetic location may be determined to be low if it is 10% or less and high if it is greater than 10%.

Several different scenarios are possible. For example, if the uncertainty is low and the distance is within a certain range, the quality satisfies the configurable threshold. In this case, the civic address is provided to the PSAP.

In contrast, if the uncertainty is low and the distance is not within a certain range, the quality does not satisfy a configurable threshold. Also, if the uncertainty is high and the distance is within a certain range, the quality does not satisfy the configurable threshold. Similarly, if the uncertainty is high and the distance is not within a certain range, the quality does not satisfy the configurable threshold. In each of these cases, the civic address is not provided to the PSAP.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and nonvolatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 4, a block diagram of an exemplary computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. It should be noted that although some components in FIG. 4 are shown in the singular, they may be plural. For example, the computing device 400 might include multiple processors or multiple radios. In aspects, the computing device 400 may be a UE/WCD, or other user device, capable of two-way wireless communications with an access point. Some non-limiting examples of the computing device 400 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 410 that directly or indirectly couples various components together, including memory 412, processor(s) 414, presentation component(s) 416 (if applicable), radio(s) 424, input/output (I/O) port(s) 418, input/output (I/O) component(s) 420, and power supply(s) 422. Although the components of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 412 may take the form of memory components described herein. Thus, further elaboration will not be provided here, but it should be noted that memory 412 may include any type of tangible medium that is capable of storing information, such as a database. A database may be any collection of records, data, and/or information. In one embodiment, memory 412 may include a set of embodied computer-executable instructions that, when executed, facilitate various functions or elements disclosed herein. These embodied instructions will variously be referred to as "instructions" or an "application" for short.

Processor 414 may actually be multiple processors that receive instructions and process them accordingly. Presentation component 416 may include a display, a speaker, and/or other components that may present information (e.g., a display, a screen, a lamp (LED), a graphical user interface (GUI), and/or even lighted keyboards) through visual, auditory, and/or other tactile cues.

Radio 424 represents a radio that facilitates communication with a wireless telecommunications network. Illustrative wireless telecommunications technologies include CDMA, GPRS, TDMA, GSM, and the like. Radio 424 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 418 may take a variety of forms. Exemplary I/O ports may include a USB jack, a stereo jack, an infrared port, a firewire port, other proprietary communications ports, and the like. Input/output (I/O) components 420 may comprise keyboards, microphones, speakers, touchscreens, and/or any other item usable to directly or indirectly input data into the computing device 400.

Power supply 422 may include batteries, fuel cells, and/or any other component that may act as a power source to supply power to the computing device 400 or to other network components, including through one or more electrical connections or couplings. Power supply 422 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for determining the quality of civic address produced by reverse geocoder, the method comprising:
    receiving, at a node, a request by a public safety answer point (PSAP) for a civic address corresponding to user equipment (UE) initiating a call for emergency services;
    identifying, by the node, a geodetic location having an uncertainty;
    initiating, by the node, an application programming interface (API) call to a reverse geocoder API, the API call including the geodetic location;
    receiving, by the node, a geocoded location corresponding to the geodetic location;
    comparing, by the node, the geocoded location to the geodetic location to determine a distance between the geodetic location and the geocoded location;
    based on the uncertainty of the geodetic location and the distance between the geodetic location and the geocoded location, determining a quality of the civic address; and
    based on the quality of the civic address satisfying a configurable threshold, providing the civic address to the PSAP, the civic address being the geocoded location.

2. The method of claim 1, further comprising based on the quality of the civic address not satisfying a configurable threshold, determining the civic address is not representative of the geodetic location.

3. The method of claim 1, wherein when the uncertainty is low and the distance is within a certain range, the quality satisfies the configurable threshold.

4. The method of claim 1, wherein when the uncertainty is low and the distance is not within a certain range, the quality does not satisfy the configurable threshold.

5. The method of claim 1, wherein when the uncertainty is high and the distance is within a certain range, the quality does not satisfy the configurable threshold.

6. The method of claim 1, wherein when the uncertainty is high and the distance is not within a certain range, the quality does not satisfy the configurable threshold.

7. The method of claim 1, further comprising determining the uncertainty is low when it is 10% or less.

8. The method of claim 1, further comprising determining the uncertainty is high when it is greater than 10%.

9. One or more non-transitory computer-readable media having computer-executable instructions embodied thereon that, when executed by at least one computing device, cause the computing device to perform operations for determining the quality of civic address produced by reverse geocoder, the operations comprising:
    receiving, at a node, a request by a public safety answer point (PSAP) for a civic address corresponding to user equipment (UE) initiating a call for emergency services;
    identifying, by the node, a geodetic location having an uncertainty;
    initiating, by the node, an application programming interface (API) call to a reverse geocoder API, the API call including the geodetic location;
    receiving, by the node, a geocoded location corresponding to the geodetic location;
    comparing, by the node, the geocoded location to the geodetic location to determine a distance between the geodetic location and the geocoded location;
    based on the uncertainty of the geodetic location and the distance between the geodetic location and the geocoded location, determining a quality of the civic address; and
    based on the quality of the civic address satisfying a configurable threshold, providing the civic address to the PSAP, the civic address being the geocoded location.

10. The one or more non-transitory computer-readable media of claim 9, further comprising based on the quality of the civic address not satisfying a configurable threshold, determining the civic address is not representative of the geodetic location.

11. The one or more non-transitory computer-readable media of claim 9, wherein when the uncertainty is low and the distance is within a certain range, the quality satisfies the configurable threshold.

12. The one or more non-transitory computer-readable media of claim 9, wherein when the uncertainty is low and the distance is not within a certain range, the quality does not satisfy the configurable threshold.

13. The one or more non-transitory computer-readable media of claim 9, wherein when the uncertainty is high and the distance is within a certain range, the quality does not satisfy the configurable threshold.

14. The one or more non-transitory computer-readable media of claim 9, wherein when the uncertainty is high and the distance is not within a certain range, the quality does not satisfy the configurable threshold.

15. The one or more non-transitory computer-readable media of claim 9, further comprising determining the uncertainty is low when it is 10% or less.

16. The one or more non-transitory computer-readable media of claim 9, further comprising determining the uncertainty is high when it is greater than 10%.

17. A system for determining the quality of civic address produced by reverse geocode, the system comprising:
    a user equipment (UE); and
    a node configured to:
    receive a request by a public safety answer point (PSAP) for a civic address corresponding to the UE initiating a call for emergency services;
    identify a geodetic location having an uncertainty;

initiate an application programming interface (API) call to a reverse geocoder API, the API call including the geodetic location;

receive a geocoded location corresponding to the geodetic location;

compare the geocoded location to the geodetic location to determine a distance between the geodetic location and the geocoded location;

based on the uncertainty of the geodetic location and the distance between the geodetic location and the geocoded location, determine a quality of the ciVic address; and based on the quality of the civic address satisfying a configurable threshold, provide the ciVic address to the PSAP, the civic address being the geocoded location.

18. The system of claim 17, wherein when the uncertainty is low and the distance is within a certain range, the quality satisfies the configurable threshold.

19. The system of claim 17, wherein when the uncertainty is low and the distance is not within a certain range, when the uncertainty is high and the distance is within a certain range, or when the uncertainty is high and the distance is not within a certain range, the quality does not satisfy the configurable threshold.

20. The system of claim 17, wherein the uncertainty is low if it is 10% or less and the uncertainty is high if it is greater than 10%.

* * * * *